United States Patent [19]

Yoshida

[11] Patent Number: 4,742,101
[45] Date of Patent: May 3, 1988

[54] CURABLE FLUOROSILICONE RUBBER COMPOSITION

[75] Inventor: Takeo Yoshida, Annaka, Japan

[73] Assignee: Shin-Etsu Chemical Co., Ltd., Tokyo, Japan

[21] Appl. No.: 13,253

[22] Filed: Feb. 10, 1987

[30] Foreign Application Priority Data

Feb. 14, 1986 [JP] Japan ................... 61-031559

[51] Int. Cl.$^4$ ................................. C08K 5/54
[52] U.S. Cl. ................... 524/267; 524/268; 524/493; 524/731; 528/15; 528/31; 528/32; 528/24; 528/42
[58] Field of Search ............ 528/24, 42, 15, 31, 528/32; 524/267, 268, 731, 493

[56] References Cited

U.S. PATENT DOCUMENTS 4,089,833  5/1978  Simpson ..................... 524/268
4,317,899  3/1982  Bluestein .................... 528/42
4,525,528  6/1985  Bush et al. .................. 528/42

*Primary Examiner*—Melvyn I. Marquis
*Attorney, Agent, or Firm*—Schwartz, Jeffery, Schwaab, Mack, Blumenthal & Evans

[57] ABSTRACT

A curable fluorosilicone rubber composition comprising particular organopolysiloxane having a fluoroalkyl group and having a viscosity of 1,000 cP or more at 25° C., reinforcing silica powder having a specific surface area of 50 m$^2$/g or more, and a vulcanizing agent; which further comprises, as a fluid for bleed, a fluid organopolysiloxane compound represented by General Formula:

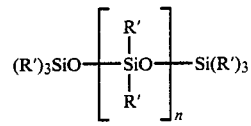

wherein some R' represent methyl groups and other R' represent phenyl groups; the ratio of the number of the methyl group to the number of the phenyl group in the molecule ranges between 70/30 and 25/75; and n is an integer of 0 to 5.

Rubber obtained by curing of this composition has excellent oil and solvent resistance, thermal resistance and low-temperature resistance which are inherent in ordinary fluorosilicone rubber, and moreover has a good fluid-bleeding property.

9 Claims, No Drawings

CURABLE FLUOROSILICONE RUBBER COMPOSITION

BACKGROUND OF THE INVENTION

1. Field of the Invention

This invention relates to a curable fluorosilicone rubber composition, and, particularly, to a composition that can give a cured product having a silicone fluid-bleeding property.

2. Prior Art

Fluorosilicone rubber, which not only has good oil and solvent resistance but also has good thermal resistance and low temperature resistance, can be useful when used under the severe conditions when these properties are required.

In respect of silicone rubber compositions (or compounds) principally composed of a dimethyl polysiloxane compound, there has been hitherto put into practical use a technique of incorporating a non-compatible fluid silicone compound as a bleed component in an adequate amount to obtain a cured product whose surface can exhibit the fluid-bleeding property, and a silicone fluid containing 5 to 25% of phenyl group as organic groups has been used as the bleed component.

In respect also of the above-mentioned fluorosilicone rubber, it can be contemplated that the fluid-bleeding property can be imparted to a cured product according to the same procedures as in the case of the above silicone rubber prinicipally composed of dimethyl polysiloxane. However, even if a fluorosilicone rubber composition is prepared according to the same procedures as in the conventional silicone rubber compositions principally composed of dimethyl polysiloxane, the resulting cured product can exhibit no sufficient fluid-bleeding property when the silicone fluid to be used as the bleed component, whether it is dimethyl silicone fluid or phenylmethyl silicone fluid, is contained in an amount of 10% or less. When it is in amount of 12 to 15%, the bleeding property can be exhibited, but the processability of the composition obtained may be seriously impaired and also the oil and solvent resistance which is an advantageous feature inherent in fluorosilicone rubber may be seriously lowered, thus raising a problem that the product is not suited for practical use.

SUMMARY OF THE INVENTION

Accordingly, an object of this invention is to provide a curable fluorosilicone rubber composition that can give a cured product having excellent oil and solvent resistance inherent in the fluorosilicone rubber, and also having good fluid-bleeding property at the same time.

This invention provides a curable fluorosilicone rubber composition comprising:

(A) 100 parts by weight of an organopolysiloxane represented by General Unit Formula (I):

wherein R comprises 25 to 50 mole % of a group represented by the formula: $-CH_2CH_2Rf$, where Rf represents a perfluoroalkyl group having 1 to 3 carbon atoms, and 75 to 50 mole % of a group selected from the group consisting of a methyl group, an ethyl group, a phenyl group and a vinyl group; and a is a number of 1.98 to 2.02;

and having a viscosity of at least 1,000 cP at 25° C.;

(B) 10 to 50 parts by weight of reinforcing silica powder having a specific surface area of at least 50 $m^2/g$;

(C) 0 to 100 parts by weight of semi-reinforcing silica powder having an average particle diameter of not greater than 50 μm;

(D) 3 to 10 parts by weight of a fluid organopolysiloxane compound represented by General Formula (II):

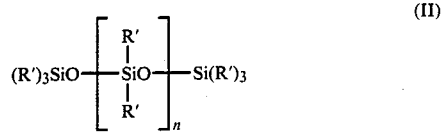

wherein some R' represent methyl groups and other R' represent phenyl groups; the ratio of the number of the methyl group to the number of the phenyl group in the molecular ranges between 70/30 and 25/75; and n is an integer of 0 to 5; and (E) a vulcanizing agent.

Rubber to be obtained by curing the curable fluorosilicone rubber composition of this invention has excellent oil and solvent resistance, thermal resistance and low-temperature resistance which are inherent in conventional fluorosilicone rubbers, and moreover has a good fluid-bleeding property.

DETAILED DESCRIPTION OF THE INVENTION

The respective components of the composition will be described below in detail.

In the organopolysiloxane of Component (A), Rf in $-CH_2CH_2Rf$ may include, for example, trifluoromethyl, pentafluoroethyl, or the like. The group $-CH_2CH_2Rf$ is contained in the R's in a proportion of 25 to 50 mole %. The proportion less than 25 mole % may result in the lowering of the oil and solvent resistance of the resulting cured product to lose the advantageous feature inherent in fluorosilicone rubber. Also, in general, it is difficult from a standpoint of production technique to make the proportion greater than 50 mole %. Moreover, Component (A) should have a viscosity of 1,000 cP or more at 25° C., preferably of from 3,000 to $1 \times 10^7$ cP. The viscosity less than 1,000 cP may also result in the lowering of the oil and solvent resistance of the resulting cured product.

The organopolysiloxane of the above Component (A) can be readily produced by effecting ring opening copolymerization according to a well known method, with addition of a chain terminator such as organodisiloxane to a cyclic siloxane mixture, in the manner that the desired polymer represented by General Unit Formula (I) may be obtained.

The reinforcing silica powder of Component (B) comprises fine powdery silica conventionally known, having a specific surface area of 50 $m^2/g$ or more, preferably of from 130 to 400 $m^2/g$, the kind of which is exemplified by fumed silica, precipitated silica, silica aerogel, etc., but not particularly limited to these. These may be treated on their surface with every kind of organosilane, organosiloxane or the like. In order for a cured product to have desirable mechanical properties, this silica powder may be compounded in an amount of 10 to 50 parts by weight, preferably 20 to 45 parts by weight, per 100 parts by weight of Component (A).

The semi-reinforcing silica powder of Component (C) is effective for increasing the oil and solvent resistance of the resulting cured product, and, at the same time, for improving the processability of the composition. This, however, is not essential, and may be optionally compounded. If Component (C) is added in an excessive amount, the mechanical strength of the cured product may be lowered, and therefore added in an amount of 100 parts by weight or less per 100 parts by weight of Component (A). As the silica powder of Component (C), there may be used powder having an average particle diameter of 50 μm or less, preferably of from 0.1 to 30 μm. This is because the one having an average particle diameter more than 50 μm may adversely affect mechanical strength or dynamic fatigue characteristics of the resulting cured product. Powder widely used conventionally in silicone rubber can be used as this silica powder, and may be exemplified by diatomaceous earth, quartz powder or the like.

The organosiloxane compound of Component (D) constitutes the heart of the characterizing feature in this invention, and is a component non-compatible with the organopolysiloxane of Component (A) and capable of exhibiting the fluid-bleeding property after curing of the composition. In General Formula (II) representing this organopolysiloxane compound, the ratio of the number of the methyl group to the number of the phenyl group in the molecule should range between 70/30 and 25/75, preferably between 60/40 and 40/60, for the reason that the ratio greater than 70/30 may give no cured product that can exhibit the fluid-bleeding property, and the ratio smaller than 25/75 may result in difficulty in the production of the organopolysiloxane compound having homogeneous structure (i.e., methyl and phenyl homogeneously distributed structure).

Examples of such organopolysiloxane compound of Component (D) may include the compounds represented by the following formulas.

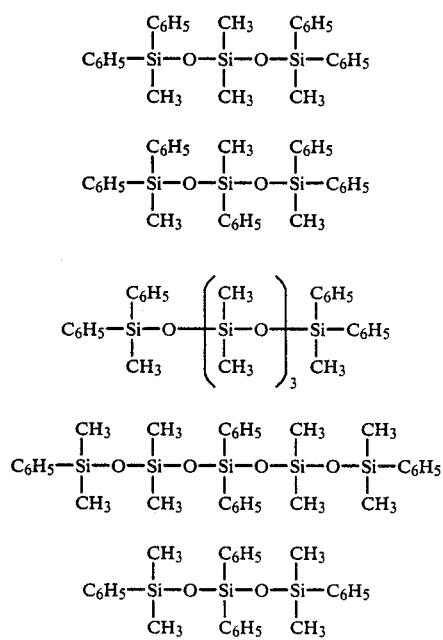

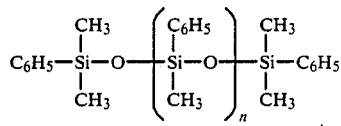

where n is an integer of 0 to 5.

In order to impart good fluid-bleeding property to a cured product, it is necessary for Component (D) to be added in an amount of 3 parts by weight or more per 100 parts by weight of Component (A). Since, however, the addition in an amount more than 10 parts by weight may sometimes results in the loss of the oil and solvent resistance of the cured product obtained, it should be added in an amount of not more than 10 parts by weight, preferably of from 5 to 8 parts by weight.

The organopolysiloxane of Component (D) can be readily produced also by effecting ring-opening copolymerization according to a well known method, with addition of a chain terminator such as organodisiloxanes to a cyclic organisiloxane mixture, in the manner that the polymer having desired formulation may be obtained.

The vulcanizing agent of Component (E) is required in order to make heat-curable the composition of this invention, and there may be used various known vulcanizing agents used for conventional heat-curable silicone rubber compositions, including, for example, peroxides such as di-tert-butyl peroxide, dicoumyl peroxide, 2,5-dimethyl-2,5-di(tert-butyl)peroxyhexane and dibenzoyl peroxide; and a platinum catalyst such as chloroplatinic acid, platinum vinylsiloxane and platinum black, which platinum catalysts are used with organopolysiloxanes having silicon-bonded hydrogen atoms for addition type vulcanization. Of these, particularly preferred are peroxides from the viewpoint of processability and storability of the composition.

These vulcanizing agents may be added generally in an amount ranging between 0.1 and 10 parts by weight based on 100 parts by weight of the composition.

Besides, to the composition of this invention, there may be optionally added processing aids used for conventional silicone rubber compositions, including, for example, metallic soaps; thermal resistance improvers such as iron oxide, titanium oxide and cerium oxide; oil resistance improvers such as zinc oxide, magnesium oxide, magnesium carbonate; etc. When the composition is compounded, compounding auxiliaries such as silanes and low molecular siloxanes may be also optionally added as known in the art.

EXAMPLES

This invention will be described below in greater detail with reference to Examples, but by no means limited to these. In the following, "parts" are all meant to be "parts by weight".

EXAMPLE 1

To 100 parts of fluoropolysiloxane produced by using a cyclic siloxane represented by the formula: [—(CF$_3$CH$_2$CH$_2$)(CH$_3$)SiO—]$_3$ and that represented by the formula: [—(CH$_2$=CH)(CH$_3$)SiO—]$_3$ as starting materials so as to comprise, as R in General Unit Formula (I), 50 mole % of a 3,3,3-trifluoropropyl group, 49.8 mole % of a methyl group and 0.15 mole % of a vinyl group, and have a viscosity of 8,000,000 cP, 2 parts of diphenylsilanediol and 20 parts of fumed silica having a specific surface area of 200 m²/g were compounded and kneaded by means of a twin roll, and thereafter subjected to heat treatment at 160° C. for 2 hours in a kneader to prepare a base composition. In Experiments Nos. I to V, components (C) to (E) as shown in Table 1 were added to the base composition and kneaded by means of a twin roll to produce respective compositions. Experiment No. V refers to a comparative example. Subsequently, the respective compositions were vulcanized at 165° C. for 10 minutes by use of a compression molding machine to obtain cured sheets 2 mm thick. Dumbbell-shaped specimens were punched out from the respective cured sheets of Experiments Nos. I to V, according to JIS K-6301 to measure the fluid-bleeding property and other properties thereof. Results obtained are shown in Table 1.

rosilicone rubber having excellent oil and solvent resistance.

TABLE 2

|  | Experiment No. |  |  |
|---|---|---|---|
|  | Working examples | | Comparative example |
|  | VI | VII | VIII |
| Base composition | 100 parts | 100 parts | 100 parts |
| Component (D) compound*¹ | (a) 6 | (a) 4 (c) 2 | — |
| Component (C): Quarts powder (particle diameter: 10 μm) | 20 | 20 | 15 |
| Component (E): 2,5-dimethyl-2,5-di(tert-butyl-peroxy)hexane | 0.5 | 0.5 | 0.5 |

TABLE 1

|  | Experiment No. | | | | |
|---|---|---|---|---|---|
|  | Working examples | | | | Comparative example |
|  | I | II | III | IV | V |
| Base composition | 100 parts | 100 parts | 100 parts | 100 parts | 100 parts |
| Component (D) compound*¹ | (a) 5 | (b) 5 | (b) 7.5 | (b) 7.5 | — |
| Component (C): Quarts powder (particle diameter: 5 μm) | — | — | — | 30 | — |
| Component (E): 2,5-dimethyl-2,5-di(tert-butylperoxy)hexane | 0.5 | 0.5 | 0.5 | 0.5 | 0.5 |
| Physical properties: | | | | | |
| Fluid-bleeding property | good | good | good | good | none |
| Hardness*² | 35 | 35 | 33 | 36 | 38 |
| Elongation (%) | 430 | 440 | 440 | 380 | 360 |
| Tensile strength (kg/cm²) | 80 | 83 | 72 | 70 | 80 |
| Compression set*³ (%) | 7.5 | 7.0 | 7.8 | 8.3 | 6.7 |
| Thermal resistance*⁴: | | | | | |
| Change in hardness (°) | +4 | +5 | +4 | +3 | +4 |
| Rate of change in elongation (%) | −9 | −10 | +2 | −7 | −12 |
| Rate of change in tensile strength (%) | −10 | −12 | −15 | −11 | −13 |

Remarks:
*¹Component (D) compound:

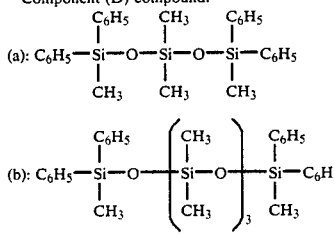

*²JIS A
*³Conditions: 150° C. × 70 hours, 25% compression
*⁴Heat aging test conditions: 200° C. × 70 hours

EXAMPLE 2

To 100 parts of the same fluoropolysiloxane as used in Example 1, 2.5 parts of diphenylsilanediol and 30 parts of fumed silica having a specific surface area of 200 m²/g were compounded by use of a twin roll to produce base compositions in the same manner as in Example 1. In Experiments Nos. VI to VIII, Components (C) to (E) as shown in Table 2 were added to the base compositions and kneaded by means of a twin roll to produce respective compositions, which were processed in the same manner as in Example 1 to obtain cured sheets 2 mm thick, and the properties thereof were evaluated. Experiment No. VIII refers to a comparative example. Results obtained are shown in Table 2. As shown in Table 2, cured products according to the examples were found to be cured products of fluid-bleeding type fluo-

| Physical properties: | | | |
|---|---|---|---|
| Fluid-bleeding property | good | good | none |
| Hardness*² | 47 | 48 | 50 |
| Elongation (%) | 400 | 430 | 370 |
| Tensile strength (kg/cm²) | 84 | 88 | 89 |
| Compression set*³ (%) | 13 | 11 | 9 |
| Fuel C volume change*⁴ (%) | 29 | 26 | 24 |
| Thermal resistance*⁵: | | | |
| Change in hardness (°) | −3 | −1 | −7 |
| Rate of change in elongation (%) | −18 | −6 | −10 |
| Rate of change in tensile strength (%) | −26 | −27 | −34 |
| Rate of change in volume (%) | +1.8 | +0.7 | +5.0 |

Remarks:
*¹Component (D) compound:
(a) and (b): Same as those set out in Table 1

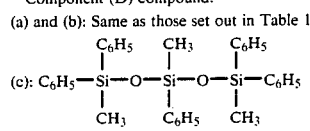

*²Same as in Table 1.
*³Same as in Table 1.
*⁴Immersed in Fuel C, which contains 50% of isooctane and 50% of toluene, at 23° C. for 72 hours.
*⁵Immersed in ASTM No. 3 Oil at 150° C. for 70 hours.

What is claimed is:

1. A curable fluorosilicone rubber composition comprising:

(A) 100 parts by weight of an organopolysiloxane represented by General Unit Formula (I):

wherein R comprises 25 to 50 mole % of a group represented by the formula: $-CH_2CH_2Rf$, where Rf represents a perfluoroalkyl group having 1 to 3 carbon atoms, and 75 to 50 mole % of a group selected from the group consisting of a methyl group, an ethyl group, a phenyl group and a vinyl group; and a is a number of 1.98 to 2.02; and having a viscosity of at least 1,000 cP at 25° C.;

(B) 10 to 50 parts by weight of reinforcing silica powder having a specific surface area of at least 50 $m^2/g$;

(C) 0 to 100 parts by weight of semi-reinforcing silica powder having an average particle diameter of not greater than 50 μm;

(D) 3 to 10 parts by weight of a fluid organopolysiloxane compound represented by General Formula (II);

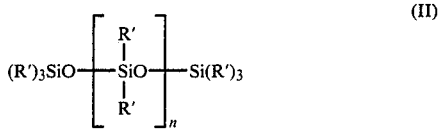

wherein some R' represent methyl groups and other R' represent phenyl groups; the ratio of the number of the methyl group to the number of the phenyl group in the molecular ranges between 70/30 and 25/75; and n is an integer of 0 to 5; and (E) a vulcanizing agent.

2. The composition according to claim 1, wherein Component (A) is organopolysiloxane represented by General Unit Formula (I), wherein R comprises 25 to 50 mole % of a 3,3,3-trifluoropropyl group or 3,3,4,4,4-pentafluorobutyl group, and 75 to 50 mole % of a methyl group, an ethyl group or a vinyl group, and a is a number of 1.98 to 2.02; and having a viscosity of 3,000 to $1 \times 10^7$ cP at 25° C.

3. A curable fluorosilicone rubber composition according to claim 1, wherein Component (B) is a silica powder having a specific surface area of 130 to 400 $m^2/g$.

4. A curable fluorosilicone rubber composition according to claim 1, wherein Component (C) is a silica powder having an average particle diameter of 0.1 to 30 μm.

5. A curable fluorosilicone rubber composition according to claim 1, wherein Component (D) is a fluid organopolysiloxane compound represented by General Formula (I), wherein the ratio of the number of the methyl group to the number of the phenyl group in the molecule ranges between 60/40 and 40/60.

6. A curable fluorosilicone rubber composition according to claim 1, wherein the vulcanizing agent of Component (E) is a peroxide.

7. A curable fluorosilicone rubber composition according to claim 1 consisting essentially of (A), (B), (C), (D) and (E).

8. A curable fluorosilicone rubber composition according to claim 1, wherein said fluid organopolysiloxane (D) is present in an amount from 5 to 8 parts by weight.

9. A curable fluorosilicone rubber composition according to claim 7, wherein said fluid organopolysiloxane (D) is present in an amount from 5 to 8 parts by weight.

* * * * *